June 2, 1953   E. M. CARBARY   2,640,871
ELECTRICAL DEVICE
Filed July 16, 1949
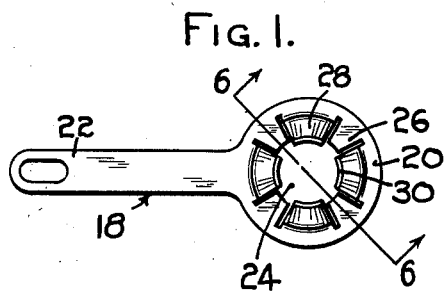
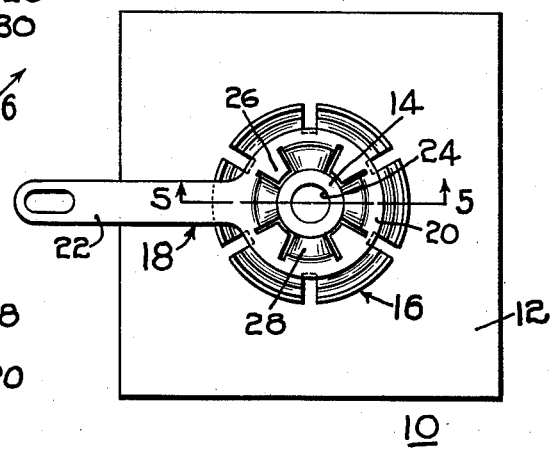
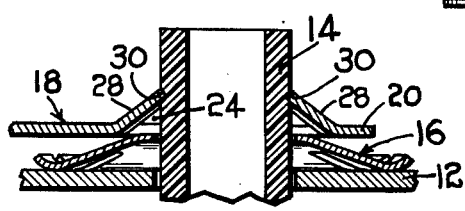
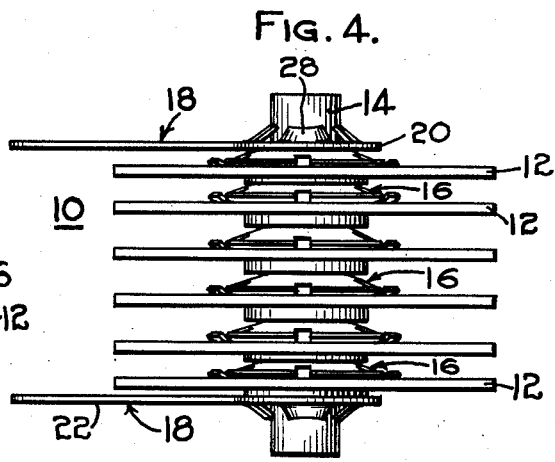
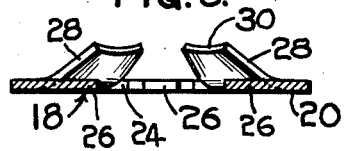
INVENTOR:
EDWARD M. CARBARY,
BY John Jodd
ATTORNEY.

Patented June 2, 1953

2,640,871

UNITED STATES PATENT OFFICE 2,640,871

ELECTRICAL DEVICE

Edward M. Carbary, South Acton, Mass., assignor to United-Carr Fastener Corporation, Cambridge, Mass., a corporation of Massachusetts Application July 16, 1949, Serial No. 105,190

6 Claims. (Cl. 175—366)

This invention relates generally to dry plate rectifier assemblies, and has particular reference to a rectifier having a locking lug for holding the plates in assembly, and to a sheet metal locking lug for use in such rectifiers.

The object of the invention is to provide a rectifier assembly having a plurality of rectifier plates stacked on a center support rod, in which a sheet metal locking lug is mounted on each end of the rod to retain the plates assembled thereon.

A further object of the invention is to provide a dry plate rectifier assembly having resilient washers interposed between rectifier plates assembled on the rod, in which a sheet metal locking lug is mounted on each end of the rod to retain the plates compressed together on the rod.

A further object of the invention is to provide a sheet metal locking lug for assembly on the end of a center rod of a dry plate rectifier to engage the rod to retain the plates in assembly, said lug being adapted to complete an electric circuit with an outermost rectifier plate, and having means thereon for connecting an electrical lead wire.

Other objects of the invention will, in part, be obvious, and will, in part, appear hereinafter.

For a fuller understanding of the nature and objects of the invention, reference should be had to the following detailed description, taken in conjunction with the accompanying drawing, in which:

Fig. 1 is a plan view of a sheet metal locking lug for mounting on the center shaft of a dry plate rectifier to engage the shaft and retain the plates in assembly;

Fig. 2 is a view in elevation of the locking lug of Fig. 1;

Fig. 3 is a plan view of a rectifier assembly embodying the features of the invention;

Fig. 4 is a view in elevation of the rectifier assembly in Fig. 3;

Fig. 5 is a view in elevation, partly in section, of a portion of the rectifier assembly of Fig. 4, showing the action of the locking lug; and Fig. 6 is a view in section taken on line 6—6 of Fig. 1.

Referring to the drawing, there is illustrated a dry-plate rectifier assembly 10, which comprises a plurality of rectifier plates 12 mounted on an insulating support rod 14, with spacing members 16 interposed between adjacent plates. The spacing members 16 serve to separate the plates to allow air circulation therebetween to dissipate heat generated in the plates during operation of the rectifier, and also serve as electrical connectors between adjacent plates. For this reason the spacers are preferably resilient, so that they are capable of being compressed when the rectifier plates are forced together during assembly to provide good electrical contact between the spacers and the plates. The support rod 14 is preferably formed of an insulating synthetic organic plastic, such as a phenolformaldehyde type resin, or the like, which is both strong enough to support the plate, and yet sufficiently deformable to allow the locking lugs to dig into the surface as will be hereinafter described.

To retain the plates in assembly on the rod, a locking lug 18 is mounted on each end of the rod beyond each outermost plate, and the lug is shaped and arranged to engage the rod after the plates have been forced together, to retain the resilient spacers under compression. The locking lug 18 preferably comprises a base 20 which is adapted to bear against an outermost rectifier plate 12 for electrical contact therewith, and an extending arm 22 for connecting an electrical lead wire (not shown) to the rectifier. As illustrated in Fig. 4, in some cases, for electrical reasons, a resilient washer 16 may also be interposed between the lug 18 and the adjacent outermost rectifier plate. The base 20 of the lug is provided with an opening 24 for receiving the support rod 14, and a first or lower series of tongues 26 is disposed on the base about the opening. The tongues 26 extend into the opening, preferably in the plane of the base, to receive the rod 14 centrally thereof. The relative dimensions of the rod and the portion of the opening bounded by the inner ends of the tongues 26 are such that the rod can freely enter the opening between the ends of the tongues. A second or upper series of tongues 28 is disposed on the base about the opening 24, and the upper tongues 28 extend upwardly from the base 20 and inwardly over a portion of the opening. The relative dimensions of the rod and the upper tongues 28 are such that the upper tongues must be flexed further upwardly by the rod to allow the lug to be inserted thereon. The ends 30 of the tongues 28 are shaped and arranged to dig into engagement with the plastic insulating rod 14 to prevent the lug from backing off the rod.

The assembly of the rectifier by use of the hereinbefore described locking lugs is easily accomplished by merely placing a lug on each end of the rod having the plates and spacers assembled thereon, and forcing the lugs onto the rod under a predetermined controlled pressure to engage the outermost plates and compress the resilient spacers 16. The lower series of tongues 26 serves to center the lug in position on the rod so that when the end of the rod contacts the ends 30 of the upper series of tongues, each of the upper tongues 28 is forced upwardly to allow the rod to enter therebetween. By this means, each tongue 28 is subject to the same amount of flexing by the rod, and consequently, the engaging force of all the tongues with the rod will be substantially equal.

Since the tongues 28 extend upwardly to engage the rod 14 at an angle, the lug 18 may be moved further onto the rod since the tongues 28, during such movement, drag along the surface of the rod, but the lug cannot be moved in the opposite direction, since in this case the ends 30 of the upper tongues engage the surface of the plastic rod. Consequently when the plates 12 are forced together during assembly, thereby compressing the resilient spacers 16, the spacers tend to expand to force the lugs off the rod, which causes the tongues 28 to dig into engagement with the surface of the deformable plastic rod 14. By this means, the expansive force of the spacers not only forces the lug into engagement with the rod, but also provides good electrical contact between the component parts of the rectifier.

Since certain obvious changes may be made in the device without departing from the scope of the invention, it is intended that all matter contained herein be interpreted in an illustrative, and not in a limiting sense.

I claim:

1. A rectifier assembly comprising a plurality of stacked rectifier plates spaced apart by compressible spacer members, said plates and said spacer members having aligned openings therein, a center insulating plastic support rod disposed through the openings having a substantially smooth exterior surface, and a locking lug disposed on at least one end of the support rod beyond the outermost rectifier plate to retain the plates assembled and compressed together on the rod, said lug comprising a base and an arm extending from the base having means thereon for connecting an electrical lead wire, said base having an opening therein to receive the rod, a series of tongues extending upwardly from the base and inwardly over the opening for engagement with the exterior surface of the rod, and other means on the base for centering the rod in relation to the tongues to provide uniform engagement of the tongues with the rod.

2. A rectifier assembly comprising a plurality of stacked rectifier plates spaced apart by compressible spacer members, said plates and said spacer members having aligned openings therein, a center insulating plastic support rod disposed through the openings having a substantially smooth exterior surface, and a locking lug disposed on each end of the support rod beyond each outermost rectifier plate to retain the plates assembled and compressed together on the rod, said lug comprising a base and an arm extending from the base having means thereon for connecting an electrical lead wire, said base being adapted to complete an electric circuit between the outermost rectifier plate and the extending arm, and having an opening therein, a first series of tongues disposed in the plane of the base and extending from the base into the opening to receive the support rod centrally thereof, and a second series of tongues disposed about the opening and extending upwardly from the base and inwardly over the opening, said second series of tongues being shaped and arranged to be flexed upwardly by the rod when the lug is assembled thereon and to engage the exterior surface of the rod, the first series of tongues serving to position the rod centrally of the second series of tongues to insure equal flexing of each of the lower tongues.

3. A rectifier assembly comprising a plurality of stacked rectifier plates spaced apart by compressible spacer members, said plates and said spacer members having aligned openings therein, a center insulating plastic support rod disposed through the openings, and a locking lug mounted on each end of the support rod to retain the plates assembled and compressed together on the rod, said lug comprising a base and an arm extending from the base for attaching an electrical lead wire, said base being adapted to complete an electric circuit between the outermost rectifier plate and the arm, and having an opening therein, a lower series of tongues disposed in the plane of the base and extending from the base into the opening to receive the rod centrally thereof, and an upper series of tongues extending upwardly out of the plane of the base and inwardly over the opening, said upper series of tongues being shaped and arranged to be flexed upwardly by the rod when the lug is assembled thereon and having ends adapted to dig into engagement with the rod, said lower series of tongues serving to position the rod during assembly to insure equal flexing of each of the upper tongues to provide uniform engagement with the rod.

4. A locking lug for assembly on a plastic support rod of a dry plate rectifier to retain the plates in assembly thereon, said lug comprising a base adapted to bear against an outermost plate for electrical contact therewith, and an extending arm disposed on the base having means thereon for attaching an electrical lead wire, said base having an opening therein to receive the rod, a lower series of tongues disposed in the plane of the base and extending from the base into the opening to receive the rod centrally thereof, and an upper series of tongues extending upwardly out of the plane of the base and inwardly over the opening, said upper series of tongues being shaped and arranged to be flexed upwardly by the rod when the lug is assembled thereon and having ends adapted to dig into engagement with the rod, said lower series of tongues serving to position the rod during assembly to insure equal flexing of each of the upper tongues to provide uniform engagement with the rod.

5. A locking lug for assembly on a rod for locking engagement therewith, said lug comprising a base having an opening therein, a terminal receiving arm extending radially outward from said base, a lower series of tongues disposed on the base about the opening, said lower series of tongues extending inwardly into the opening in the plane of the base to receive the rod centrally thereof, and an upper series of tongues disposed on the base about the opening and extending upwardly from the base and inwardly over the opening, said upper series of tongues being shaped and arranged to be flexed upwardly by the rod when the lug is assembled thereon and having ends adapted to dig into engagement with the rod, said lower series of tongues serving to abut the side of the rod and position it centrally of the upper tongues during assembly to insure equal flexing of each of the upper tongues to provide uniform engagement with the rod.

6. A locking lug for assembly on a rod for locking engagement therewith, said lug comprising a base having an opening therein, an arm extending radially outward from said base including means for receiving an electrical lead wire, a first series of tongues extending from the base into the opening to receive the rod centrally thereof, and a second series of tongues extending inwardly and upwardly from the base, said second series of tongues having ends shaped and arranged to be flexed upwardly by the rod when the lug is assembled thereon, the lower series of tongues serving to position the rod centrally of the second series of tongues to insure equal flexing of each of the tongues of the second series.

EDWARD M. CARBARY.

References Cited in the file of this patent

UNITED STATES PATENTS

| Number | Name | Date |
|---|---|---|
| 1,801,836 | Aumann | Apr. 21, 1931 |
| 2,400,647 | Kohring | May 21, 1946 |
| 2,414,801 | Clarke | Jan. 28, 1947 |
| 2,473,419 | Fletcher et al. | June 14, 1949 |
| 2,483,801 | Becwar | Oct. 4, 1949 |

FOREIGN PATENTS

| Number | Country | Date |
|---|---|---|
| 518,127 | Great Britain | Feb. 19, 1940 |